US009928110B2

(12) United States Patent
Loveless

(10) Patent No.: US 9,928,110 B2
(45) Date of Patent: Mar. 27, 2018

(54) RESOURCE ALLOCATION BASED ON PROCESSOR ASSIGNMENTS

(71) Applicant: CFPH, LLC, New York, NY (US)

(72) Inventor: Jacob Loveless, New York, NY (US)

(73) Assignee: CFPH, LLC, New York, NY (US)

( * ) Notice: Subject to any disclaimer, the term of this patent is extended or adjusted under 35 U.S.C. 154(b) by 240 days.

(21) Appl. No.: 14/348,932

(22) PCT Filed: Mar. 31, 2014

(86) PCT No.: PCT/US2014/032434
§ 371 (c)(1),
(2) Date: Apr. 1, 2014

(87) PCT Pub. No.: WO2015/152893
PCT Pub. Date: Oct. 8, 2015

(65) Prior Publication Data
US 2017/0010917 A1   Jan. 12, 2017

(51) Int. Cl.
*G06F 9/50* (2006.01)

(52) U.S. Cl.
CPC .......... *G06F 9/5033* (2013.01); *G06F 9/5016* (2013.01); *G06F 9/5094* (2013.01)

(58) Field of Classification Search
None
See application file for complete search history.

(56) References Cited

U.S. PATENT DOCUMENTS

| | | | | |
|---|---|---|---|---|
| 5,596,751 A * | 1/1997 | Glas | ......................... | G06F 8/45 718/106 |
| 5,951,665 A * | 9/1999 | Crane, Jr. | ............. | G06F 13/409 710/301 |
| 6,782,410 B1 * | 8/2004 | Bhagat | .................. | G06F 9/5027 709/201 |
| 7,032,099 B1 * | 4/2006 | Imamura | ................... | G06F 9/52 712/29 |
| 2002/0184445 A1 * | 12/2002 | Cherabuddi | .......... | G06F 12/084 711/130 |
| 2003/0172313 A1 * | 9/2003 | Jain | ....................... | G06F 1/3203 713/300 |
| 2006/0193250 A1 * | 8/2006 | Desjardins | .............. | G06F 1/206 370/219 |
| 2011/0246804 A1 * | 10/2011 | Kaburlasos | ........... | G06F 1/3203 713/340 |
| 2011/0276978 A1 * | 11/2011 | Gaiarsa | ..................... | G06F 9/46 718/104 |
| 2013/0117843 A1 * | 5/2013 | Komaromy | ............. | G06F 21/52 726/22 |

(Continued)

OTHER PUBLICATIONS

Notification Concerning Transmittal of Int'l Preliminary Report on Patentability for PCT/US2014/032434; dated Oct. 13, 2016; 8 pages.

(Continued)

*Primary Examiner* — Bradley A Teets

(57) ABSTRACT

An apparatus may include first and second processors. A first user may be bound to the first processor such that processes of the first user execute on the first processor and do not execute on the second processor. A second user may be bound to the second processor such that processes of the second user execute on the second processor and do not execute on the first processor.

20 Claims, 2 Drawing Sheets

(56) References Cited

U.S. PATENT DOCUMENTS

2013/0159744 A1* 6/2013 Gooding ............... G06F 1/3234
                                                    713/320
2013/0227238 A1* 8/2013 Vijverberg ............ G06F 9/5077
                                                    711/170

OTHER PUBLICATIONS

SG Written Opinion for Application No. 11201608172X; dated May 29, 2017; 8 pages.

* cited by examiner

RESOURCE ALLOCATION BASED ON PROCESSOR ASSIGNMENTS

CROSS REFERENCE TO RELATED APPLICATIONS

This application is a national stage application of International App. No. PCT/US2014/032434, filed Mar. 31, 2014, to Jacob Loveless, which is hereby incorporated by reference herein in its entirety.

BACKGROUND

Various types of computing systems with multiple processors and memories are known.

SUMMARY

According to an example embodiment, an apparatus may comprising: a first processor and a second processor; a first set of memory and a second set of memory each communicatively coupled to the first processor and to the second processor; and a memory having instructions stored thereon that when executed by at least one processor direct the at least one processor to: execute for a first user a computing application as a first process, wherein the first user is bound to the first processor such that the first process executes on the first processor and does not execute on the second processor; execute for a second user a computing application as a second process, wherein the second user is bound to the second processor such that the second process executes on the second processor and does not execute on the first processor; move the first process from an execution state to a wait state; move the first process from the wait state to the execution state, wherein moving the first process from the wait state to the execution state includes determining that the first process executes on the first processor and not the second processor, and executing the first process on the first processor based on the determination; move the second process from the execution state to the wait state; and move the second process from the wait state to the execution state, wherein moving the second process from the wait state to the execution state includes determining that the second process executes on the second processor and not the first processor, and executing the second process on the second processor based on the determination.

The above advantages and features are of representative embodiments only, and are presented only to assist in understanding the invention. They are not to be considered limitations on the invention as defined by the claims. Additional features and advantages of embodiments of the invention will become apparent in the following description, from the drawings, and from the claims.

DESCRIPTION

Figure 1:
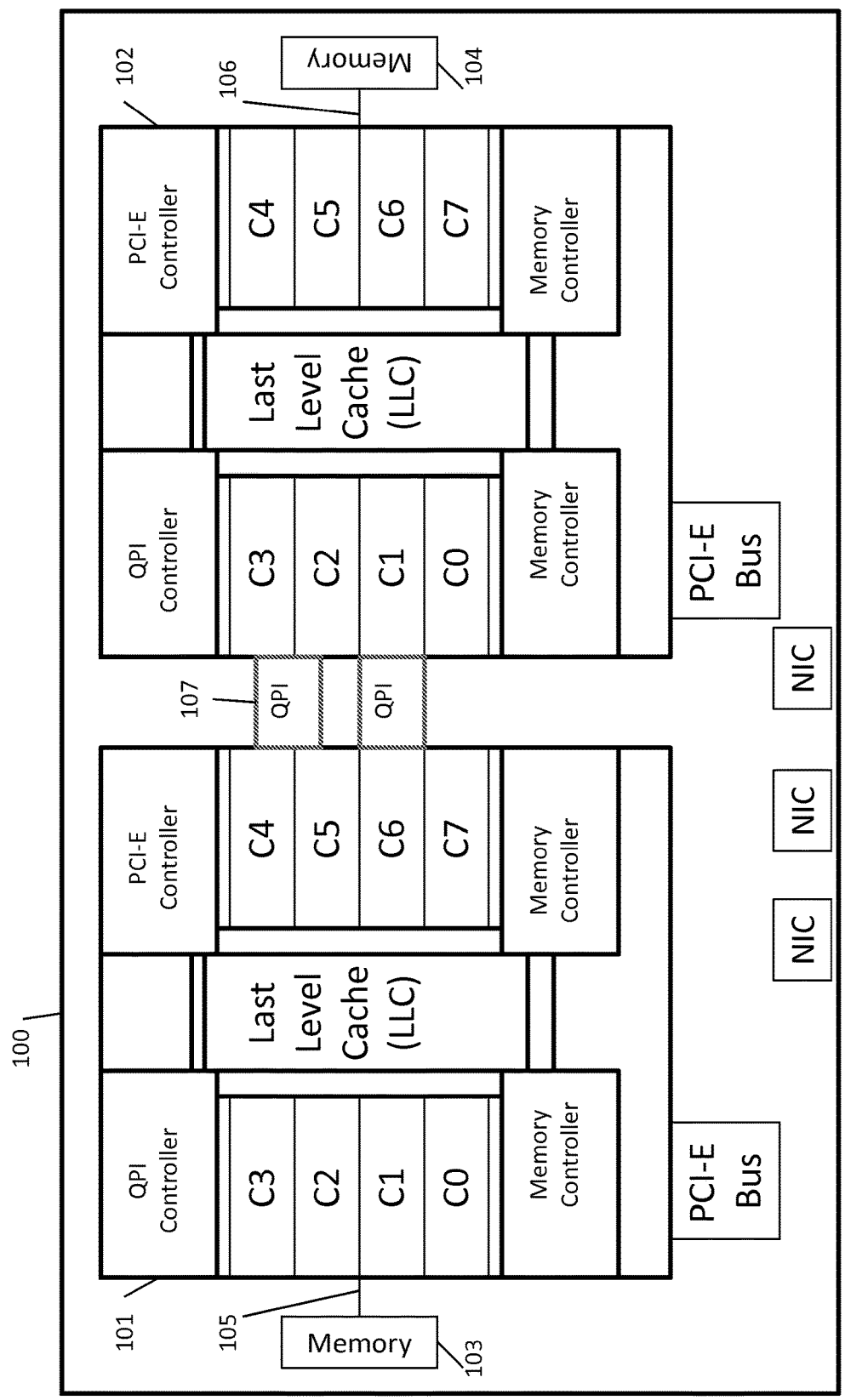
FIG. 1 is an example computing system.

Referring to FIG. 1 there is shown a portion of an example computing system 100. System 100 may include two processors, 101 and 102, although system 100 may include more than two processors. As an example, processors 101 and 102 may each be separate "chips" (e.g., semiconductor chips) that may each be situated in a separate "socket" of a mother board of system 100. As an example, processors 101 and 102 each be an Intel 2687W, although other processors may be used, including different processors for each of processors 101 and 102. Each processor 101 and 102 may include two or more cores (each of which may execute software based instructions) and one or more memory controller(s). In this example, each processor includes eight cores, shown as C0-C7.

System 100 may further include two sets of memory modules 103 and 104 (e.g., dual in-line memory modules (DIMM)), although additional sets of memory modules may be used. Each set of memory modules 103 and 104 may be 64 GB, although larger and/or smaller size memories may be used. Each set of memory 103 and 104 may be physically separate from processor 101 and 102 (i.e., may be memory that is not physically located on either of processors/chips 101 and 102) (i.e., each set of memory 103 and 104 may be situated in a socket(s) of a mother board of system 100, which socket(s) may be separate from the sockets of processors 101 and 102). As shown in FIG. 1, memory 103 may be connected by a bus 105 to processor 101 and memory 104 may be connected by a bus 106 to processor 102. As an example, memory 103 and 104 may be used as caches, main memory, etc., storing application instructions, data, etc. for application(s) executing on processors 101 and/or 102. Furthermore, processors 101 and/or 102 may each be able to utilize/communicate with either one or both of memories 103 and 104, having applications that execute on the respective processor stored on either and having memory allocated from either as required by applications. The term application/program, as used herein, may refer to a set of software instructions that when executed by a processor, perform one or more tasks or functions. An application may execute on a processor as a computing process (e.g., a process may be viewed as the actual execution of the instructions that embody an application). An application/process may allocate memory, spawn/create other processes that perform other tasks, etc.

System 100 may also include, for example, an interconnect system 107 that interconnects processors 101 and 102 to each other and to other resources of system 100. As an example, interconnect system 107 may be the Intel Quick-Path Interconnect (QPI).

System 100 may also include one or more network interface cards (NICs) 110 that may interconnect computing system 100 to one or more networks. Processors 101 and 102 may access/communicate with any of the NICs through a bus, such as a Peripheral Component Interconnect (PCI) bus, although other bus architectures may be used.

According to one example, system 100 may be a Non-Uniform Memory Access (NUMA) architecture. In particular, as shown in FIG. 1, processor 101 may be physically located closer to memory 103 than to memory 104 and similarly, processor 102 may be physically located closer to memory 104 than to memory 103.

According to an example aspect of the system 100 architecture, the cores of processor 101 may be able to access memory 103 faster than they may be able to access memory 104 (which may require in part the use of interconnect 107). Similarly, the cores of processor 102 may be able to access memory 104 faster than they may be able to access memory 103 (which may require in part the use of interconnect 107). According to a further example aspect of the system 100 architecture, any core of processor 101 may be able to communicate with any other core of processor 101 faster than it may be able to communicate with any core of processor 102 (which may require in part the use of interconnect 107). Similarly, any core of processor 102 may be able to communicate with any other core of processor 102 faster than it may be able to communicate with any core of processor 101 (which may require in part the use of interconnect 107). As an example, intra-processor core communication (i.e., communication between cores of the same processor) may be about 10 ns while inter-processor core communication (i.e., communication between cores of different processors) may be about 21 ns, or about 2× slower.

System 100 may also include/run a single instance (or multiple instances) of an operating system (software based instructions of which may be stored in one or memory modules and/or disks etc. (including memories 103 and/or 104 and/or other memories not shown), and which may execute on processors 101 and/or 102 and/or another processor(s) not shown), such as Illumos Core (which is a branch of Open Solaris). As is known in the art, such an operating system may control the execution of applications executing on system 100, may control the allocation of resources of system 100 (e.g., processor usage, memory allocation, NIC usage, etc.) among such applications, and may control the interaction of such applications, etc. One skilled in the art will recognize that Solaris is merely an example, and system 100 may execute other operating systems.

System 100, through the operating system, may also support multiple users. Each of these users may desire to execute one or more applications and/or may have one or more applications executing on behalf of the user. For each user, the operating system of system 100 may create a "user space" for that user's applications to execute under. As is known in the art, an operating system may create a user space for each user to ensure, for example, the execution of applications of one user do not interfere with the execution of applications of another user. As another example, a "Solaris Zone" may be created for each user. Zones are used herein merely as an example. According to one example operation of system 100, the operating system may allow the user space or a zone, etc. of each user to execute on any of processors 101 and 102. In other words, for a given user, system 101 may execute the applications of that user and more specifically, the various processes through which these applications execute, on any of the cores of processors 101 and 102. Similarly, system 101 may store in any of memories 103 and 104 the instructions, data, etc. associated with such applications. Hence, at any given time, for example, a given user may have processes executing on core(s) of processor 101 and core(s) of processor 102 and have instructions/data/etc. stored in both memories 103 and 104. As can be noted from above regarding inter-core process communications and non-local memory access, if such processes are working together to perform a given task, performance issues may arise as a result of inter-processor core communications and memory accesses to non-local memory.

Figure 2:
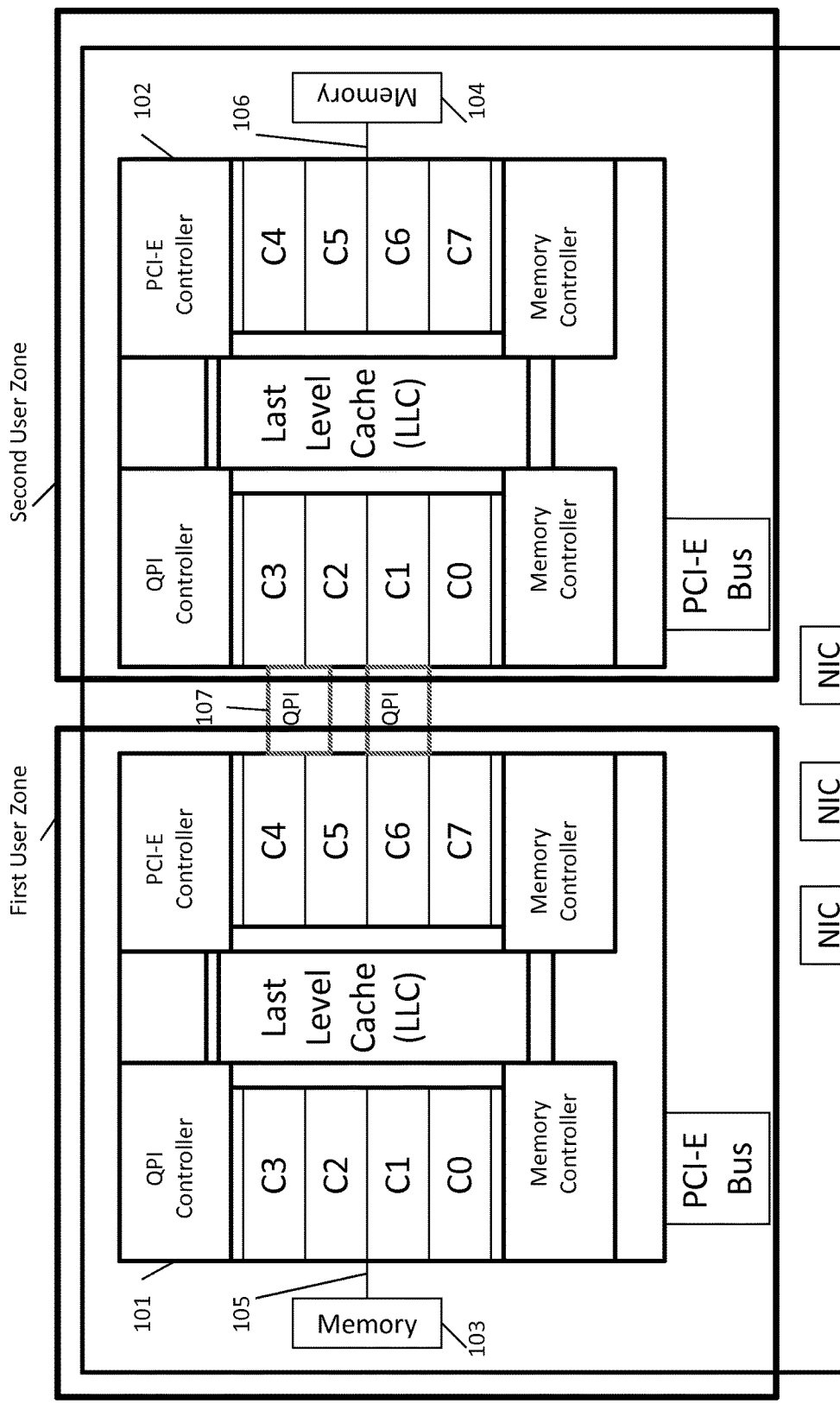
FIG. 2 is the example computing system of FIG. 1 with users bound to particular resources.

According to example operation of system 100, the operating system may be modified and/or configured such that the user space, a zone, etc. of a given user may be assigned/bound to a specific processor and/or memory such that the applications of that user are executed only by the assigned processor, and such that the memory used by those applications is only the assigned memory. Preferably, although not required, the set of memory assigned to the user is the memory that is physically located nearest to the processor to which the user is assigned. According to a further example, a given user may be assigned to a specific NIC such that the applications of that user only use that NIC. As one example, only one user may be assigned to a given processor and set of memory (and possibly NIC). Hence, assuming system 100 has n processors each with a corresponding set of memory, system 100 may support n users. Hence, referring to FIG. 2, the user space, zone, etc. of a first user may be assigned to processor 101 and memory 103, and the user space, zone, etc. of a second user may be assigned to processor 102 and memory 104.

As another example, more than one user may be assigned to a given processor and set of memory. According to this example, the operating system may be modified and/or configured such that, for example:

the user space, zone, etc. of a first user may be assigned to a specific one or more core(s) of a first processor (e.g., cores 0-3 of processor 101) and to specific range of a first set of memory (e.g., memory 103), and the user space, zone, etc. of a second user may be assigned to a different specific one or more core(s) of a first processor (e.g., cores 4-7 of processor 101) and to specific different range of the first set of memory (e.g., memory 103).

One skilled in the art will recognize other variations/configurations are possible. For example, a given user may be assigned/bound to more than one processor/set of memory and have each of his applications/processes execute on any of them, or specific applications/processes assigned to specific ones of the processors, or cores, etc. Other variations are possible.

Using one user per processor as an example, as the operating system of system 100 is invoked to create a new user space, zone, etc. for a new user, a determination may be made as to which processor/memory (and possibly NIC) of system 100 to assign the user/to bind the user to. This determination may be made, for example, by an administrative application that monitors the resources of system 100. Such an application is further described below.

Accordingly, as a new user space, zone, etc. is created, a new process (e.g., referred to as "process-A"), for example, may be created/invoked/spawned for that user, which process may execute an application (e.g., referred to as "application-A"). As process-A is created, the operating system may make an indication in a process table/process control block, for example, that process-A is to execute only on the core(s) (or specific ones of cores) of the assigned processor (e.g., processor 101) and is to only use memory (or specific range of memory) from the assigned memory (e.g., memory 103). Thereafter, application-A instructions of process-A may be loaded into memory 103, data space may be allocated from memory 103 as required by application-A, and process-A may then be executed on the core(s) of processor 101. In a similar fashion, the operating system may make an indication in the process table/process control block, for example, that process-A is to use a specific NIC if necessary.

In the course of un-scheduling and rescheduling the execution of process-A (e.g., in context-switching—moving the process from a run/execution state, to a wait/standby state, to the run/execution state as may occur in a multitasking system), as the operating system reschedules process-A to execute/run, the operating system may note from the process table, for example, that process-A is to only execute on processor 101 and thereafter execute/load process-A thereon (or onto specific core(s) thereon), and load Application-A etc, as may be necessary into memory 103.

According to a further aspect, when application-A makes a system call to the operating system to create a new process (e.g., referred to as process-B) to execute an application (e.g., referred to as application-B), the operating system may make an indication in the process table/process control block, for example, that process-B is to execute only on the core(s) of processor 101 and is to only use memory from memory 103. The operating system may, for example, note that process-A is invoking process-B and use the information from the process table on process-A as an indication as to where process-B is to execute and which memory should be used, etc. Thereafter, application-B instructions of process-B may be loaded into memory 103, data space may be allocated from memory 103 as required by application-B, and process-B then executed/loaded on the core(s) of processor 101.

Similarly, when application-A makes a system call to the operating system to allocate memory, the operating system may note from the process table that process-A is to use memory 103 and thereby allocate memory there from. Similarly, when application-A makes a system call to create a network connection (e.g., to create a socket), the operating system may note from the process table that process-A is to use a specified NIC and thereby assign the connection to that NIC. One skilled in the art will recognize that other means of assigning a user to a given processor/memory/NIC may be used.

As indicated above, an administrative application may be used to monitor the resources of system 100 and determine which processor/memory/NIC of system 100 to assign to a new user. Such an application may execute on system 100, or may execute on another system that monitors the resources of system 100, and other systems like system 100. For example, a plurality of computing systems (like system 100, each with a plurality of processors and memories) may be configured on a network. An additional administrative computing system(s) may also be connected to this network and control the allocation of resources on each of the computing systems 100. Such an overall system may be, for example, a cloud based system. Hence, as a new user desires the use of resources, the administrative computing system(s) may receive this indication and determine from among the plurality of computing systems 100 which of the systems has an available processor. Thereafter, the administrative computing system(s) may select one of the available processors, mark it as now in use, and instruct the computing system of the processor to create a new user space, zone, etc for the user.

According to another example, an administrative application may assign a user to particular processor based on a determination of whether there is covariance between the user and another user(s). More specifically, as a processor executes instructions, the processor will generate heat. As is known, heat may cause a processor to run slower. Accordingly, assume processor 101 and processor 102 of a given computing system are respectively assigned to two users where each of the users are correlated such that they tend execute applications related to the same event, for example (i.e., at the same time). As a result, processors 101 and 102 may tend to heat up at the same time creating additional heat that needs to be dissipated. This heat may degrade the performance of both processors. Accordingly, it may be advantageous to not assign correlated users to adjacent processors (i.e., in this example, it may be beneficial to assign the first user to a processor of a first computing system and the second user to a processor of a second computing system. As another example, if a computing system has more than two processors, it may be beneficial to assign the two users to two processors that have the greatest distance between one another).

One example of where two users may be correlated is in systems that support the buying and selling of items, such as financial instruments. Two users may be deemed correlated if the users have similar interest in the same instruments and as such, tend to buy and sell at the same time.

According to one example, the determination of whether two users are correlated may be made based on historical data and thereby made at the initial time a user is assigned to a processor. According to another example, an administrative application may monitor the heat being produced by a given computing system (e.g., a computing system may have one or more heat sensors). If the heat reaches a defined threshold, an initial determination may be made that the users assigned to the computing system are correlated. Further analysis may then be conducted on data (e.g., in a trading system, an analysis may be made on trading records) to determine if the users are indeed correlated. If a determination is made that users a correlated, one user may be moved to another processor. Other variations are possible.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure.

What is claimed is:

1. An apparatus comprising:
   a first processor and a second processor;
   a third processor, wherein the first and third processors are spatially separated at a greater distance than the first and second processors;
   a first set of memory and a second set of memory each communicatively coupled to the first processor and to the second processor; and
   a memory from at least one of first set of memory and second set of memory having instructions stored thereon that when executed by at least one processor direct the at least one processor to:
      execute for a first zone a computing application as a first process, wherein the first zone is assigned to the first processor such that the first process is to execute on the first processor and not execute on the second processor;
      execute for a second zone a computing application as a second process, wherein the second zone is assigned to the second processor such that the second process is to execute on the second processor and not to execute on the first processor;
      move the first process from an execution state to a wait state;
      move the first process from the wait state to the execution state, wherein moving the first process from the wait state to the execution state includes determining that the first process is assigned to execute on the first processor and not the second processor, and executing the first process on the first processor based on the determination;
      move the second process from the execution state to the wait state; and
      move the second process from the wait state to the execution state, wherein moving the second process from the wait state to the execution state includes determining that the second process is assigned to execute on the second processor and not the first processor, and executing the second process on the second processor based on the determination;
determine that an amount of heat being produced by the first and second processors exceeds a threshold; and
determine that at least one application of the first zone and at least one application of the second zone are correlated; and based at least in part on determining that the amount of heat being produced by the first and second processors exceeds a threshold and that at least one application of the first zone and at least one application of the second zone are correlated, move the first zone to the third processor such that the first zone is assigned to the third processor.

2. The apparatus of claim 1, wherein the instructions, when executed by the at least one processor, further direct the at least one processor to:
receive from the first process an indication to create another process for the first zone;
determine that the first zone is assigned to the first processor; and
based at least in part on determining that the first zone is assigned to the first processor, execute the another process for the first zone on the first processor.

3. The apparatus of claim 2, wherein the instructions, when executed by the at least one processor, further direct the at least one processor to:
receive from the second process an indication to create another process for the second user;
determine that the second zone is assigned to the second processor; and
based at least in part on determining that the second zone is assigned to the second processor, execute the another process for the second zone on the second processor.

4. The apparatus of claim 3,
wherein the first processor is configured to store data on the first set of memory and the second set of memory;
wherein the second processor is configured to store data on the first set of memory and the second set of memory;
wherein the first zone is further assigned to the first set of memory such that the first process uses the first set of memory to store data and does not use the second set of memory to store data; and
wherein the second zone is further assigned to the second set of memory such that the second process uses the second set of memory to store data and does not use the first set of memory to store data.

5. The apparatus of claim 4, wherein the instructions, when executed by the at least one processor, further direct the at least one processor to:
receive from the first process an indication to allocate memory;
determine that the first zone is assigned to the first set of memory; and
based at least in part on determining that the first zone is assigned to the first set of memory, allocate memory from the first set of memory.

6. The apparatus of claim 5, wherein the instructions, when executed by the at least one processor, further direct the at least one processor to:
receive from the second process an indication to allocate memory;
determine that the second zone is assigned to the second set of memory; and
based at least in part on determining that the second zone is assigned to the second set of memory, allocate memory from the second set of memory.

7. The apparatus of claim 6, wherein the first processor, the second processor, the first set of memory, and the second set of memory are physically situated within the apparatus, wherein the first processor is physically located closer to the first set of memory than the second set of memory, and wherein the second processor is physically located closer to the second set of memory than the first set of memory.

8. The apparatus of claim 1,
wherein the first processor is configured to store data on the first set of memory and the second set of memory;
wherein the second processor is configured to store data on the first set of memory and the second set of memory;
wherein the first zone is further assigned to the first set of memory such that the first process uses the first set of memory to store data and does not use the second set of memory to store data; and
wherein the second zone is further assigned to the second set of memory such that the second process uses the second set of memory to store data and does use not the first set of memory to store data.

9. The apparatus of claim 8, wherein the instructions, when executed by the at least one processor, further direct the at least one processor to:
receive from the first process an indication to allocate memory;
determine that the first zone is assigned to the first set of memory; and
based at least in part on determining that the first zone is assigned to the first set of memory, allocate memory from the first set of memory.

10. The apparatus of claim 9, wherein the instructions, when executed by the at least one processor, further direct the at least one processor to:
receive from the second process an indication to allocate memory;
determine that the second zone is assigned to the second set of memory; and
based at least in part on determining that the second zone is assigned to the second set of memory, allocate memory from the second set of memory.

11. The apparatus of claim 10, wherein the first processor, the second processor, the first set of memory, and the second set of memory are physically situated within the apparatus, wherein the first processor is physically located closer to the first set of memory than the second set of memory, and wherein the second processor is physically located closer to the second set of memory than the first set of memory.

12. The apparatus of claim 1, wherein the first processor comprises a plurality of cores, and wherein the first zone being assigned to the first processor comprises the first zone being assigned to a subset of the plurality of cores such that the first process executes on one or more of the subset of the plurality of cores and does not execute on any core not part of the subset of cores.

13. A method comprising:
executing by a processor for a first zone a computing application as a first process, wherein the first zone is assigned to a first processor such that the first process is to execute on the first processor and not execute on a second processor;
executing by the processor for a second zone a computing application as a second process, wherein the second zone is assigned to the second processor such that the second process is to execute on the second processor and not to execute on the first processor;

moving by the processor the first process from an execution state to a wait state;
moving by the processor the first process from the wait state to the execution state, wherein moving the first process from the wait state to the execution state includes determining that the first process is assigned to execute on the first processor and not the second processor, and executing the first process on the first processor based on the determination;
moving by the processor the second process from the execution state to the wait state;
moving by the processor the second process from the wait state to the execution state, wherein moving the second process from the wait state to the execution state includes determining that the second process is assigned to execute on the second processor and not the first processor, and executing the second process on the second processor based on the determination;
determining by the processor that an amount of heat being produced by the first and second processors exceeds a threshold; and
determining by the processor that at least one application of the first zone and at least one application of the second zone are correlated; and
based at least in part on determining that the amount of heat being produced by the first and second processors exceeds a threshold and that at least one application of the first zone and at least one application of the second zone are correlated, moving the first zone to a third processor such that the first zone is assigned to the third processor, wherein the first and third processors are spatially separated at a greater distance than the first and second processors.

14. The method of claim 13, further comprising:
receiving from the first process an indication to create another process for the first zone;
determining that the first zone is assigned to the first processor; and
based at least in part on determining that the first zone is assigned to the first processor, executing the another process for the first zone on the first processor.

15. The method of claim 14, further comprising:
receiving from the second process an indication to create another process for the second user;
determining that the second zone is assigned to the second processor; and
based at least in part on determining that the second zone is assigned to the second processor, executing the another process for the second zone on the second processor.

16. A non-transitory, computer-readable memory, having instructions thereon that when executed by at least one processor direct the at least one processor of at least one computer to:
execute for a first zone a computing application as a first process, wherein the first zone is assigned to a first processor such that the first process is to execute on the first processor and not execute on a second processor;
execute for a second zone a computing application as a second process, wherein the second zone is assigned to the second processor such that the second process is to execute on the second processor and not to execute on the first processor;
move the first process from an execution state to a wait state;
move the first process from the wait state to the execution state, wherein moving the first process from the wait state to the execution state includes determining that the first process is assigned to execute on the first processor and not the second processor, and executing the first process on the first processor based on the determination;
move the second process from the execution state to the wait state;
move the second process from the wait state to the execution state, wherein moving the second process from the wait state to the execution state includes determining that the second process is assigned to execute on the second processor and not the first processor, and execute the second process on the second processor based on the determination;
determine that an amount of heat being produced by the first and second processors exceeds a threshold; and
determine that at least one application of the first zone and at least one application of the second zone are correlated; and based at least in part on determining that the amount of heat being produced by the first and second processors exceeds a threshold and that at least one application of the first zone and at least one application of the second zone are correlated, move the first zone to a third processor such that the first zone is assigned to the third processor, wherein the first and third processors are spatially separated at a greater distance than the first and second processors.

17. The non-transitory, computer-readable memory of claim 16, having instructions thereon that when executed by at least one processor direct the at least one processor of at least one computer to:
receive from the first process an indication to create another process for the first zone;
determine that the first zone is assigned to the first processor; and
based at least in part on determining that the first zone is assigned to the first processor, execute the another process for the first zone on the first processor.

18. The non-transitory, computer-readable memory of claim 17, having instructions thereon that when executed by at least one processor direct the at least one processor of at least one computer to:
receive from the second process an indication to create another process for the second user;
determine that the second zone is assigned to the second processor; and
based at least in part on determining that the second zone is assigned to the second processor, execute the another process for the second zone on the second processor.

19. The non-transitory, computer-readable memory of claim 18, having instructions thereon that when executed by at least one processor direct the at least one processor of at least one computer to:
configure the first processor to store data on a first set of memory and a second set of memory;
configure the second processor is configured to store data on the first set of memory and the second set of memory;
further assign the first zone to the first set of memory such that the first process uses the first set of memory to store data and does not use the second set of memory to store data; and
further assign the second zone to the second set of memory such that the second process uses the second set of memory to store data and does not use the first set of memory to store data.

20. The non-transitory, computer-readable memory of claim 19, having instructions thereon that when executed by at least one processor direct the at least one processor of at least one computer to:
- further configure the first processor to store data on the first set of memory and the second set of memory;
- further configure the second processor to store data on the first set of memory and the second set of memory;
- further assign the first zone to the first set of memory such that the first process uses the first set of memory to store data and does not use the second set of memory to store data; and
- further assign the second zone to the second set of memory such that the second process uses the second set of memory to store data and does not use the first set of memory to store data.

* * * * *